SYSTEM 1

SYSTEM 2

SYSTEM 3

INVENTORS
BY Henry P. Kalmus.
Milton Sanders

March 14, 1950  H. P. KALMUS ET AL  2,500,547
LIGHT-INTENSITY MEASURING DEVICE
Filed Sept. 3, 1949  4 Sheets-Sheet 2

LUMINOUS FLUX THRU MEDIUM
FIG. 4

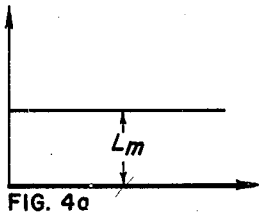
FIG. 4a — $L_m$

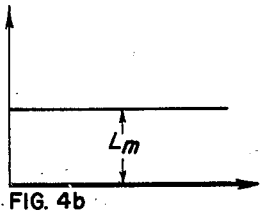
FIG. 4b — $L_m$

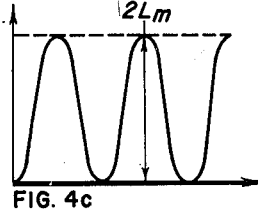
FIG. 4c — $2L_m$

AVERAGE LUMINOUS FLUX
FIG. 5

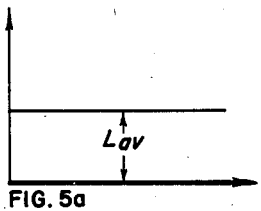
FIG. 5a — $L_{av}$

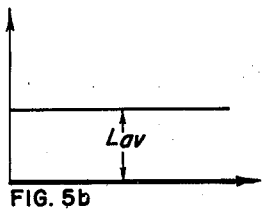
FIG. 5b — $L_{av}$

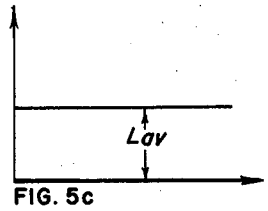
FIG. 5c — $L_{av}$

CURRENT THRU THE PHOTO ELEMENT
FIG. 6

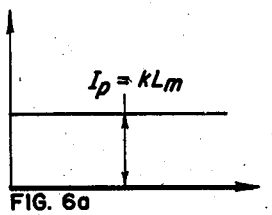
FIG. 6a — $I_p = kL_m$

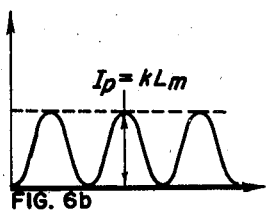
FIG. 6b — $I_p = kL_m$

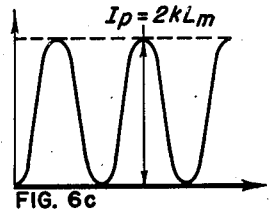
FIG. 6c — $I_p = 2kL_m$

CURRENT THRU METER
FIG. 7

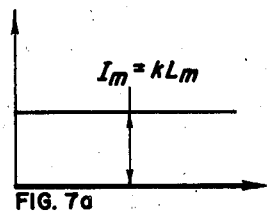
FIG. 7a — $I_m = kL_m$

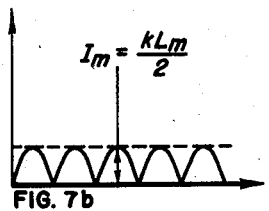
FIG. 7b — $I_m = \dfrac{kL_m}{2}$

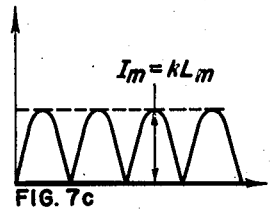
FIG. 7c — $I_m = kL_m$

AVERAGE CURRENT THRU METER
FIG. 8

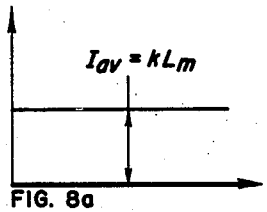
FIG. 8a — $I_{av} = kL_m$

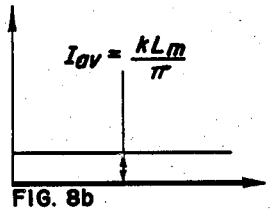
FIG. 8b — $I_{av} = \dfrac{kL_m}{\pi}$

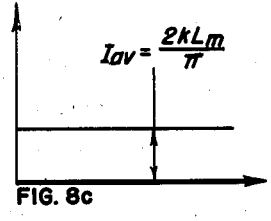
FIG. 8c — $I_{av} = \dfrac{2kL_m}{\pi}$

INVENTORS
BY Henry P. Kalmus.
Milton Sandler

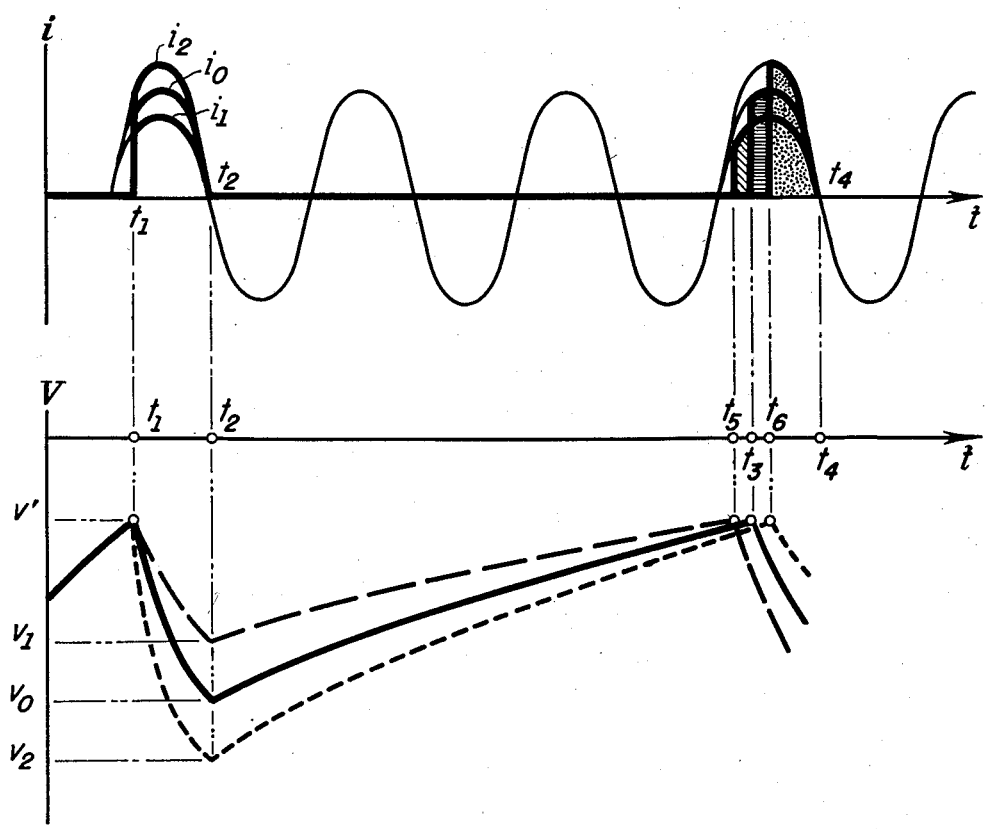
FIG. II

Patented Mar. 14, 1950

2,500,547

UNITED STATES PATENT OFFICE 2,500,547

LIGHT-INTENSITY MEASURING DEVICE

Henry P. Kalmus, Washington, D. C., and Milton Sanders, Silver Spring, Md.

Application September 3, 1949, Serial No. 113,928

5 Claims. (Cl. 250—214)

Our invention relates to light-intensity measuring devices and has particular reference to devices for measuring the effect of a particular medium or material in attenuating or otherwise modifying the intensity of a source of illumination. Such modification may occur as the result of transmitting the light through the medium or reflecting it from the medium, or a combination of both. One example of such use is in the case of a densitometer, which is an instrument used to measure the transparency of material by measuring the attenuation of light from a source of known intensity transmitted through a specimen. Another example of a use for which our invention is particularly adapted is in measuring the light-reflecting power of different surfaces.

In either of the above-mentioned examples, it may be essential to measure very small amounts of light, for example in the case of dense or nearly opaque transmitting media (densitometer use) or in the measurement of very poor reflecting surfaces. In either instance there is a practicable limit to the illuminating source intensity which may be used because of the energy which is transformed into heat in the medium. Therefore, it is essential that the measuring system employed be as sensitive as possible. It is a primary object of our invention to provide the maximum sensitivity in a device or system of the aforesaid type.

In order to make clear the nature and underlying principles of our invention the following preliminary discussion is presented to indicate the background of the problem and the present state of the art as it is known to us.

The simplest and most obvious way of measuring light of low intensity is by means of a light sensitive element (e. g. a photoelectric cell) whose necessarily feeble D. C. output is measured by means of a D. C. amplifier.

Such amplifiers are inherently unstable so that instruments of this kind require strong light sources, because of the limited stable amplifier gain.

A better solution consists of a photosensitive element in which the electric output voltage is periodically interrupted. Now, an alternating current amplifier, tuned to the same frequency or one harmonically related can be used. Such amplifiers can be easily designed with a very high and stable gain. In order to obtain a high signal to noise ratio, frequency selective means have to be employed in the A. C. amplifier. Tuned circuits and/or synchronized rectifiers can be used. If the light output is rich in harmonics, the amplifier may be tuned to one of them.

A more sensitive method than the preceding two consists in modulating the light before it reaches the light sensitive device. This has been done in the prior art for example, by intermittently blocking the light by a rotating shutter or chopper, and amplifying the resulting alternating current output from the light sensitive device.

It is an important object of our invention to avoid mechanical modulating means and to use incandescent lamps as an intermittent light source in a densitometer or reflectometer, by modulating the lamp supply voltage and to keep the modulating frequency low so that substantially 100% light modulation can be obtained in spite of the thermal inertia of the filament.

It is a further object of our invention to provide a power supply for the lamp in such a way that the amplitude of the varying luminous flux is independent of variations in supply voltage changes.

It is a third object of our invention to provide a system of the type described which may be used in presence of other background lights thereby eliminating the necessity for using the instrument in the dark or necessitating other precautions against background light.

Our invention posseses numerous other objectives and features of advantage some of which together with the foregoing will be set forth in the following description of specific apparatus embodying and utilizing our novel method. It is therefore to be understood that our method is applicable to other apparatus and that we do not limit ourselves in any way to the apparatus of the present application as we may adopt various other apparatus embodiments, utilizing the method within the scope of the appended claims.

The invention will be better understood from the following description taken in connection with the drawings, in which.

Figure 1:
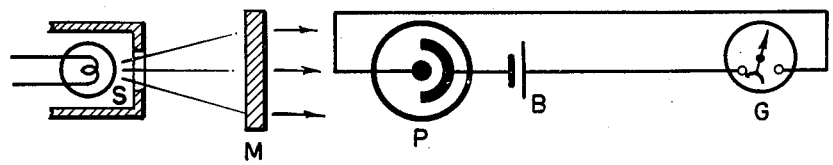
Figure 1 is a schematic diagram showing a densitometer arrangement employing straight D. C. amplification.
Figure 2:
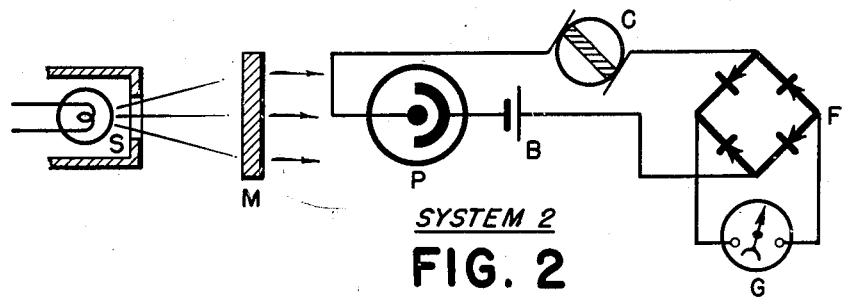
Figure 2 is a similar diagram showing A. C. modulation of the output of the light sensitive element.
Figure 3:
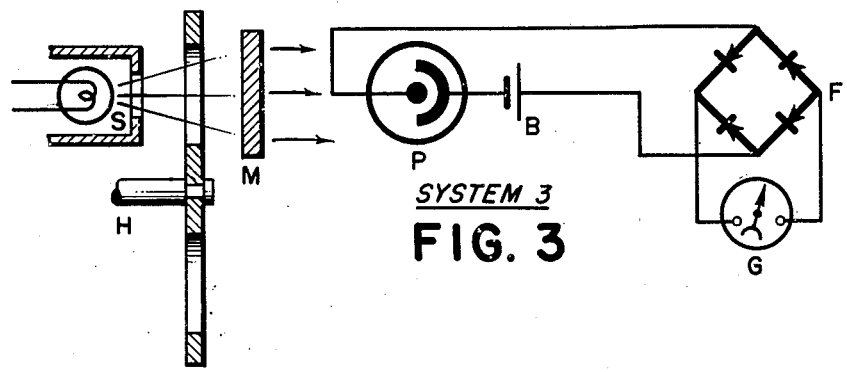
Figure 3 is a similar diagram showing modulation of the light source by a mechanical chopper.

Figures 4 to 8 inclusive are charts showing the comparative efficiencies of the three systems shown in Figures 1, 2 and 3 respectively.

Figure 9:
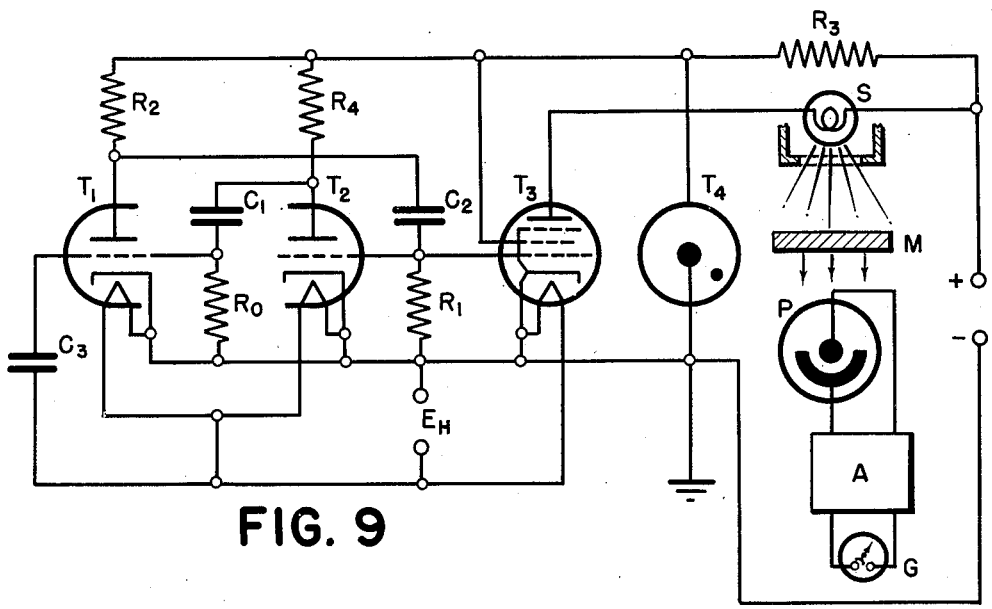
Figure 10:
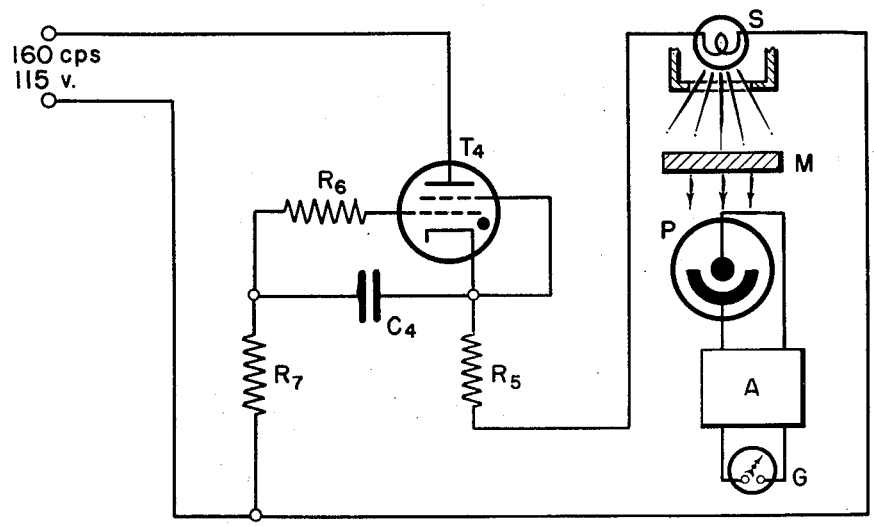

Figure 9 is a circuit diagram of one form of our invention, showing a circuit for low-frequency modulation of a lamp;

Figure 10 is a circuit diagram of an alternative form of our invention using a single thyratron tube;

Figure 11 is a chart showing the voltage and current conditions in the circuit of Figure 10.

In comparing the merits of the three light measuring systems, we assume that the same average luminous flux is passing through the medium, so that the same amount of heat is produced by absorption. In every system under consideration, a D. C. instrument is used as an indicator so that the average current through this instrument gives an exact indication for the figure of merit.

In Figures 1, 2 and 3, the basic circuit for the three cases is shown. Figure 1 shows a light source S, the medium M whose density is to be measured, a photosensitive cell P, a battery B, and an ammeter G.

Figure 2 shows a second system. An interrupter C and a full wave rectifier F are inserted between P and G.

Figure 3 shows a third system. Here, a sinusoidal light chopper H is inserted between S and M. There is a full wave rectifier F between P and G.

Figures 4 to 8 inclusive show the working conditions for the three systems. The subscripts $a$, $b$ and $c$ in these figures refer to the systems shown in Figures 1, 2 and 3 respectively. In Figure 4, the light flux $L_m$, passing through the medium, is shown for each system. The time average value $L_{av}$, which is kept constant for all three cases, is shown in Figure 5. The current $I_p$, produced by the photoelement, is shown in Figure 6 wherein the constant $k$ designates the efficiency of the photoelement. The current through the meter, $I_m$, is shown in Figure 7 and the average current through the meter, $I_{av}$, is shown in Figure 8.

In Figure 4a, the luminous flux through the medium for the D. C. case is shown. The average value, as shown in Figure 5a, has the same value. This results in a current produced by the photoelement of $I_p=kL_m$ as shown in Figure 6a. The current through the meter and its average value are equal and are shown in 7a and 8a.

In Figure 4b, the luminous flux through the medium is again $L_m$ and its average value $L_{av}$ as shown in Figure 5b. In Figure 6b, the current produced by the photoelement, has a peak to peak value $I_p=kL_m$ and is sinusoidally modulated. After full-wave rectification, the current through the meter has a peak to peak value $$I_m = \frac{kL_m}{2}$$

as shown in Figure 7b. The average meter current is then $$I_{av} = \frac{kL_m}{\pi}$$

and shown in Figure 8b.

In Figure 4c, a periodically changing light flux with a peak to peak amplitude $2L_m$ is shown and is used to produce the average light flux $L_{av}$ as shown in Figure 5c. The current, produced by P, has a peak to peak value $I_m=2kL_m$ shown in Figure 6c. The current through the rectifier F has a peak to peak value $I_m=kL_m$ shown in Figure 7c and an average value $$I_{av} = \frac{2kL_m}{\pi}$$

shown in Figure 8c.

Let the figure of merit be the average meter current per unit light flux through the medium. The figure of merit for the first case is then $k$. For the second case it is $$\frac{k}{\pi}$$

and for the third case $$\frac{2k}{\pi}$$

This means that for the same amount of heat absorbed in the medium and for a meter deflection 100% in the first case, we obtain 33% in the second and 66% in the third case.

In system 1, galvanometers or D. C. amplifiers are employed. Galvanometers are expensive, fragile, require zero adjustment and are bulky. Direct current amplifiers are inherently unstable and require extensive voltage stabilization. These characteristics seriously limit the use of system 1, despite its high figure of merit. Of the remaining two, system 3 has the higher figure of merit and is therefore preferable.

The use of mechanical shutters in system 3 is undesirable because of the space required and because of mechanical vibrations which can produce microphonic voltages in the amplifying system. Light sources using ionized gases can easily be modulated 100%, but they must be discarded because of their limited spectral distribution. Incandescent lamps have a very wide and desirable spectral distribution; however, they have not been used in the prior art because 100% light modulation is impossible at conventional frequencies.

Furthermore, if the supply voltage to an incandescent lamp changes, the luminous flux output changes at a higher percentage rate. Incandescent lamps have been used for densitometers and reflectometers in systems 1, 2 and 3; however, constant voltage transformers or other expensive voltage regulators were necessary to keep the supply voltage constant. Still another disadvantage of each of the three systems shown in Figures 1, 2 and 3 is that stray background luminous flux other than the light source S emanating from the direction of S will cause a reading on meter G. This generally requires that the instrument be used in a dark room or that other precautions be taken against stray background light.

Referring to the drawing in Figure 9:

The two sections $T_1$ and $T_2$ of the double-triode are used as a multivibrator, oscillating at a frequency, say, 20 cycles per second. This frequency is determined by the time constant of the coupling elements $R_0$, $C_1$ and $R_1$, $C_2$. The resistors $R_2$ and $R_4$ are the plate loads for the two triodes $T_1$ and $T_2$. The incandescent lamp S is connected between the plate of a pentode $T_3$ and the positive terminal of the power supply. The screen voltage of this tube together with the plate voltage of the multivibrator is kept constant by a gas tube $T_4$ and a series resistor $R_3$.

The pentode is controlled by the grid voltage of tube $T_2$. This voltage is negative most of the time and has positive excursions 20 times in a second. Correspondingly, the plate current of the pentode is pulsed at the same frequency and is used directly to heat the lamp. Substantially 100% modulation of the light output is therefore obtained. However, if other means of coupling between pentode and lamp are used, the lamp may flash at a harmonically related frequency.

All cathodes are heated by a 60 cycle 6 volt, supply $E_H$. A part of this voltage is employed to keep the multivibrator synchronized with the 3rd subharmonic of the 60 cycle supply by coupling through condenser $C_3$ to the grid of $T_1$. The light output of the lamp S is directed through the medium M, to the photosensitive element P, which in turn feeds an amplifier A tuned to light frequency or one harmonically related. The output of amplifier A is connected to indicator G.

The current through the lamp S is stable because of the flat plate-current versus plate voltage characteristic of the pentode. Thus, the plate supply, which has to deliver an average current of, say 50 ma., does not have to be stabilized. Measurements showed that a light output change of only 5% is obtained for a 10% supply voltage change with the circuit of Figure 9. If the same lamp is fed directly from the supply, a light output change of 30% is observed with a 10% supply voltage change. The new circuit, therefore, reduces the light output change if compared with conventional designs, by a factor of 6.

An alternate arrangement is shown in Figure 10. Here, the generation of the low frequency supply voltage for the light source S is accomplished by a single tube, $T_4$. This tube is a gas thyratron of the 2050 type which is heated in a conventional manner and which derives its plate supply directly from the 60 C. P. S. supply line.

The plate current path is formed by the resistor $R_5$ and by the incandescent lamp S. The grid is connected to one side of the line through resistors $R_6$ and $R_7$. Their common point is connected to cathode through condenser $C_4$. As before, M is the medium, P the photoelement, A the amplifier and G the indicator.

If the tube ignites at time $t_1$, a current $i_0$ flows through the lamp S and resistor $R_5$ as shown in Figure 11. This current pulse lasts until time $t_2$ when the line voltage reverses. Condenser $C_4$ is charged during the time from $t_1$ to $t_2$ through resistor $R_7$ and the voltage across $C_4$ with respect to cathode reaches a negative value $v_0$ at time $t_2$. Afterwards, the condenser $C_4$ slowly discharges through $R_7$ to a value $V'$ at time $t_3$. This voltage represents the maximum negative bias with which the tube can ignite again during a positive cycle. The next pulse will have a duration from $t_3$ to $t_4$ and the process repeats itself at a frequency determined by $C_4$ and $R_7$. Resistor $R_6$ serves only to prevent grid current of the thyratron. The light intensity is determined by the shaded area in Figure 11.

Stability of the light output is obtained as follows:

If the line voltage is decreased, a smaller current $i_1$ flows through $R_5$ and S and the voltage across resistor $R_5$ and the lamp S is reduced. (The percentage change of voltage across $R_5$ and S is even higher than the line-voltage change because the voltage drop across the thyratron itself is kept almost constant.) Correspondingly, condenser $C_4$ is charged to a lower voltage $V_1$ and voltage $V^1$ is reached after a shorter time interval at $t_5$. Consequently, the current pulse lasts now from $t_5$ to $t_4$. We see, therefore, that the area of the current pulse is substantially unaltered. The pulse loses in amplitude, but it gains in width.

Similarly, if the line voltage increases, a higher current $i_2$ flows, condenser $C_4$ charges to $V_2$, the current starts to flow at $t_6$ and the current pulse is narrowed. The area, again, is substantially unchanged. Synchronization is obtained automatically because the current pulse is derived from the 60 C. P. S. line directly.

Either of the above circuits may be used together with a photosensitive element, an amplifier, rectifier and a meter as a densitometer, as shown in Figure 10. The amplifier is tuned to the frequency of the modulated light in order to obtain the best possible signal to noise ratio. This tuning may be accomplished by circuit elements in the amplifier or synchronous rectification may be employed in accordance with known practice. If a synchronized rectifier is used, it can be driven by the lamp current generator.

The above embodiments of our invention are intended only by way of example, and it will be obvious to those skilled in the art that changes and modifications may be made without departing from the scope of the invention as defined in the appended claims.

We claim:

1. Apparatus for measuring the light-modifying characteristic of a specimen comprising in combination, an incandescent lamp, a voltage supply for said lamp cyclicly so varying the voltage of said supply as to produce substantially 100% modulation of the light output; a light sensitive element constructed and arranged to produce an output potential or current which is a function of the (instantaneous) value of light reaching said element; means for directing modulated light from said lamp toward a light-modifying specimen to be tested; means for directing modified light from such specimen toward said light-sensitive element to produce a cyclic electrical output therefrom having a frequency rate harmonically related to the frequency of the lamp voltage; amplifying means tuned to said output frequency for amplifying said cyclic electronic output; and means for indicating the value of said amplified output.

2. In combination with a light sensitive element constructed and arranged to produce an output potential or current which is a function of the instantaneous value of light reaching said element, and means for amplifying and indicating the integrated output for said potential or current; a standard light source for said element comprising an incandescent lamp, current supply means for said lamp, means for varying the intensity of current supplied to said lamp at a rate sufficiently low to produce substantially 100% modulation of the light therefrom, means for directing modulated light from said lamp toward a material capable of modifying said light, and means for directing said modified light to said light sensitive element; wherein, said means for amplifying include frequency selective components tuned to a frequency harmonically related to the modulating frequency.

3. In combination with a light sensitive element constructed and arranged to produce an output potential or current which is a function of the instantaneous value of light reaching said element, and means for amplifying and indicating the integrated output for said potential or current; a standard light source for said element comprising an incandescent lamp, current supply means for said lamp, means for varying the intensity of current supplied to said lamp at a rate sufficiently low to produce substantially 100% modulation of the light therefrom, means for directing modulated light from said lamp toward a material capable of modifying said light, and means for directing said modified light to said light sensitive element; wherein the current supply means for the light source comprises an electron tube having a substantially flat region in its plate-current versus plate-voltage characteristic means for periodically changing the bias of the tube so as to vary the plate current at the modulating rate and circuit parameters for said tube adjusted to maintain operation thereof within said substantially flat region during said variation, whereby plate voltage variations within said flat region have substantially no effect on the plate current.

4. In combination with a light sensitive element constructed and arranged to produce an output potential or current which is a function of the instantaneous value of light reaching said element, and means for amplifying and indicating the integrated output for said potential or current; a standard light source of said element comprising an incandescent lamp, current supply means for said lamp, means for varying the intensity of current supplied to said lamp at a rate sufficiently low to produce substantially 100% modulation of the light therefrom, means for directing modulated light from said lamp toward a material capable of modifying said light, and means for directing said modified light to said light sensitive element; wherein the current supply means comprises a pentode tube, circuit means connecting the output of said pentode with said lamp as a supply therefore, circuit means for maintaining operation of said tube in the substantially flat region of its plate-current vs. plate-voltage characteristics, an electronic switching circuit for periodically changing the grid bias of said pentode so as to produce said 100% lamp modulation.

5. In combination with a light sensitive element constructed and arranged to produce an output potential or current which is a function of the instantaneous value of light reaching said element, and means for amplifying and indicating the integrated output for said potential or current; a standard light source for said element comprising an incandescent lamp, current supply means for said lamp, means for varying the intensity of current supplied to said lamp at a rate sufficiently low to produce substantially 100% modulation of the light therefrom, means for directing modulated light from said lamp toward a material capable of modifying said light, and means for directing said modified light to said light sensitive element; wherein the current supply means comprises an A. C. supply voltage, a thyratron, arranged to ignite and extinguish at a predetermined cyclical rate, and circuit means for controlling the time of ignition of the thyratron so that the area of individual current pulses is made independent of supply voltage changes.

HENRY P. KALMUS.
MILTON SANDERS.

REFERENCES CITED

The following references are of record in the file of this patent:

UNITED STATES PATENTS

| Number | Name | Date |
|---|---|---|
| 2,229,451 | Gulliksen | Jan. 21, 1941 |